Patented Dec. 27, 1949

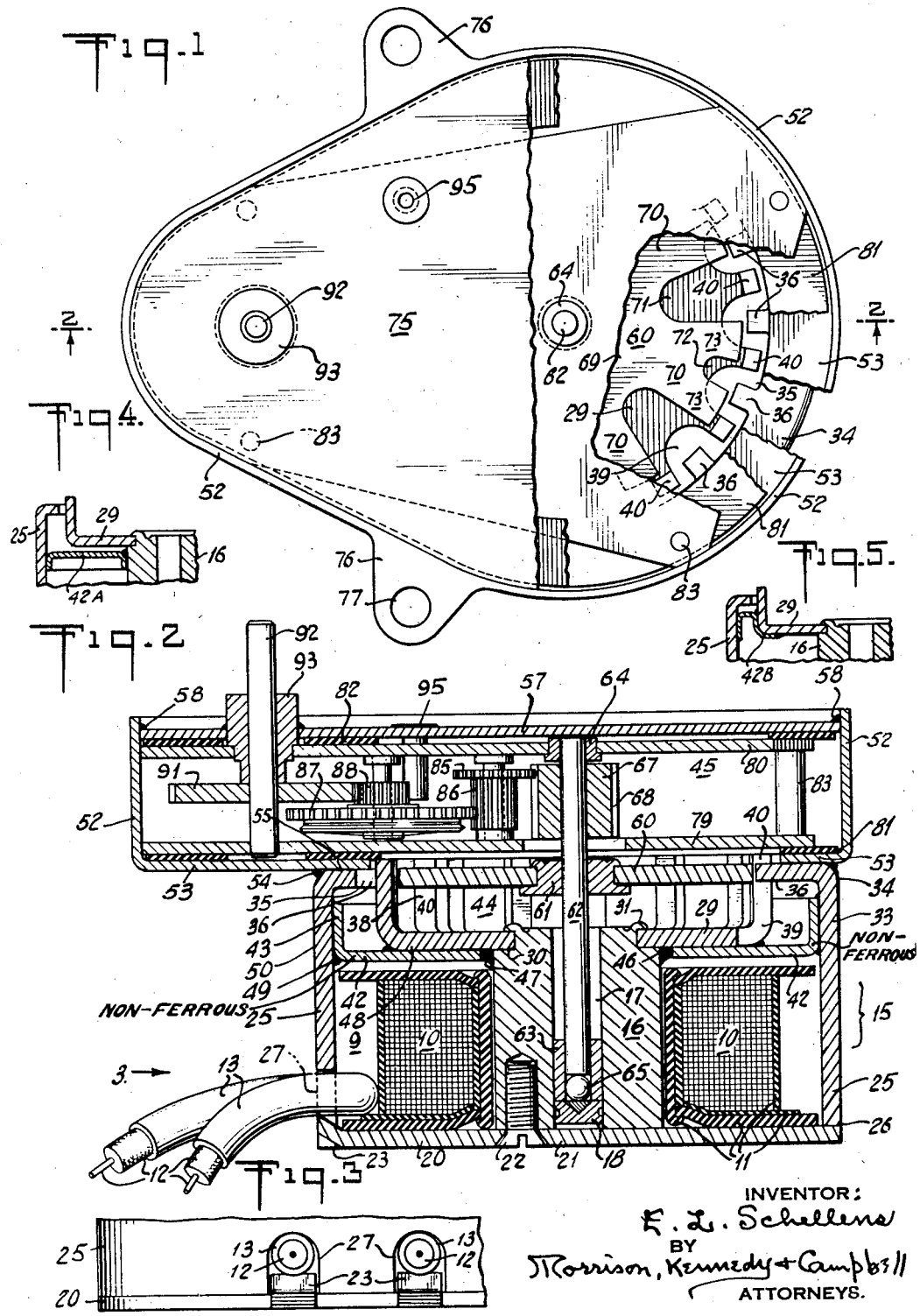

2,492,197

UNITED STATES PATENT OFFICE 2,492,197

SMALL ELECTRIC MOTOR

Eugene L. Schellens, Essex, Conn., assignor to The R. W. Cramer Company, Incorporated, Centerbrook, Conn., a corporation of Connecticut Application January 6, 1947, Serial No. 720,371

15 Claims. (Cl. 172—278)

This invention is a novel small electric motor, designed specifically as a synchronous motor, whether of the alternating current inductor type or other types, and having especial reference to small and simple motors of fractional horsepower. Such motors conventionally have, cooperative with a coil-energized field structure or stator, a magnetic-poled rotary armature or rotor preferably permanently magnetized and carried upon the motor shaft or spindle; and usually a reducing gear train driven from one end, in this case from what for convenience is herein termed the front or rotor end of the shaft, the speed reduction affording a useful multiplication of delivered rotary power. These small or synchronous motors are of great advantage, especially when possessing self-starting operation as generally prevails, and have come into very large practical use, for various light driving purposes, such as the operation of clocks or of timing switches or relays, or other timers, or controllers or meters, and for various operational and control functions.

A typical example of a small synchronous electric motor of a class and type to which the present invention has been successfully applied is that disclosed in the British patent of Chamberlain et al. No. 489,246 of 1938, the structure and operation of which will be hereinafter referred to by way of comparatively describing and distinguishing certain features of improvement constituting the present invention; but it is to be understood that the usefulness of the present invention is not limited to a motor of the specific type or structure illustrated in said Chamberlain patent. No prior art motor is known to applicant embodying a structure approaching any more closely the present invention than does that of the Chamberlain patent. In this applicant's copending application, Serial No. 623,558, filed October 20, 1945, for a self-starting synchronous motor, is contained a structural disclosure embodying certain features of the present invention; the present application being to that extent a continuation in part of the copending case, patented February 17, 1948, No. 2,436,231.

An important general object of the present invention is to afford a reorganization or general structural revision of small synchronous and like motors of the class and type referred to in a manner to improve materially, not merely the practical operation, handling, use and maintenance of the motor, but also its manufacture including production of parts, assembling thereof and completion of the construction, with high accuracy but low cost. A particular object is to afford a structure of such motor wherein the rotor and the driven elements or gear train, taking off from the rotor end of the motor shaft or spindle, located at the front side of the motor, and preferably running in oil, are completely isolated and sealed off from the rear stationary parts, including the annular energizing coil housed or enclosed within the rear portions of the stator.

A further object is so to construct and rearrange the motor parts at the rear side that the enclosed annular coil, located in a compartment or well between the central core and the peripheral wall, may be readily inserted into position either during initial assembling of the motor or subsequently, and may be readily removed for replacement by a similar or a different coil, in cases of coil impairment, or for change of motor characteristics; in other words, notwithstanding the sealed separation of the front motor elements from the annular coil recess, ready access is herein provided to the latter. Further objects and advantages of the present invention will be explained in the hereinafter following description of an illustrative embodiment of the invention or will be understood by those conversant with the subject. To the attainment of such objects and advantages the present invention consists in the novel small electric motor and the novel features of combination, operation, construction, arrangement and detail herein illustrated or described; and as well the method and steps of manufacture.

In the accompanying drawings:

Fig. 1 may be considered a front or face view of a small motor embodying the present invention, the motor being assumed to be mounted in a posture with its main shaft or spindle placed horizontally, although it could be mounted in any other posture, according to use; this figure being partially broken away to show in face view the structure of the poles of the rotor and stator.

Fig. 2 is a central section, taken substantially on the section line 2—2 of Fig. 1, as seen in underneath view; in this figure the parts nearer to the observer to be considered the back or rear parts of the motor, and the far parts as the front parts, for purposes of terminology.

Fig. 3 is a partial exterior view looking in the direction of the arrow 3 on Fig. 2 and showing a detail of the construction at the near left side of Fig. 2 whereby the coil lead wires and their intake sheaths are afforded exit from the coil compartment and are lightly gripped and held to minimize play.

Figs. 4 and 5 are partial section views corresponding with part of Fig. 2 but showing modifications thereof.

The invention, constituting a combination and special relationship of previously known elements with certain novel elements, may be described as follows upon the illustrative showing of a small electric motor. In the drawing, within the compartment or annular recess 9, is shown the annular coil or winding 10, operative for energizing the stator 15 to be described. The coil is shown contained upon a spool or bobbin 11, composed of non-ferrous sheet material, such as laminated fiber. The terminal ends of the coil are extended from the recess through wall apertures 27, to be described, where they constitute covered lead wires 12, and near the motor are preferably surrounded by short intake sheaths 13 of stiff flexibility.

The stator 15 as a whole constitutes the field structure or fixed magnetic element of the motor, cooperating with the movable element or rotor 60 to be described. The stator element is of iron, preferably of soft iron as used for field magnets, and consists of several iron portions arranged to provide, as a whole, the magnetic circuit of the stator, energized by the coil 10. Thus, as shown, and embodying certain of the principles of this invention, the stator comprises the central or core portion 16, the exterior rear wall portion 20, the peripheral wall portion 25 and the interior flange wall portion 29.

The central core 16 is arranged longitudinally within, and surrounded by, the coil. While the core might be solid, it is preferably of the hollow design, having an axial bore 17 to accommodate the motor shaft 62 and its rear bearing 65. The rear end of the bore or central cavity of the core is shown closed and sealed by a plug 18, inserted wholly within the bore.

The rear wall, 20 being a separate piece from the core, is an exterior wall shown as a flat disk, although it might depart from flatness, while the rear wall might be an annulus, its central portion 21 is preferably closed, and thereby serves to close and seal the bore 17. For the rear wall there is provided an attaching or mounting means to secure the wall tightly in position contiguous to the rear end of the core, with substantial contact and continuance of the magnetic circuit flowing through the iron portions of the stator. The mounting means may be of various kinds and variously located, peripherally or otherwise, as by screw threads formed on the rear wall itself; so long as the attaching means is easily detachable, according to this invention, to permit the ready removal of the rear wall from the assembled motor, thus to give access to the coil compartment. For these purposes there is illustratively shown a machine screw 22, in this case passing through and countersunk within a flaring aperture in the rear wall, and the screw extending into a threaded recess in the core, being shown offset to one side of the motor axis to leave clear the axial elements within the bore 17. The off-center screw may be of iron to form part of the magnetic circuit.

In the preferred embodiment the rear wall 20 is a piece separate not only from the core 16 but from the peripheral wall 25, contrary to the integral non-removable cup-like wall of the Chamberlain patent; although the point of separation between the rear wall and the peripheral wall might be somewhat further along frontwardly beyond the rear corner of the stator, as will be further explained. Near its periphery the rear wall 20 is preferably formed with one or two small spurs or teeth 23, arranged to press and bite against and stabilize the lead wires or their sheaths.

The periphery wall 25 of the stator is an outer wall, surrounding the coil and enclosing circumferentially the coil compartment 9, and for practical reasons the peripheral wall is preferably cylindrical as shown. This housing or enclosing wall 25 is shown as extending from the outer rim or extreme edge of the rear wall 20 frontwardly to where it provides or carries what is herein termed the outer series of stator poles to be further described.

Specifically, as shown, the rear wall 20 and peripheral wall 25 have their division line located at the point 26, so that the rear wall is shown as occupying the whole rear end of the stator while the peripheral wall occupies the entire circumferential extent of the stator. It is believed however to be broadly new to provide a rear stator wall which, without further disassembling, is readily detachable to give access to the coil recess or compartment, and this whether or not the division line 26 is near the corner of the stator as shown or is substantially therebeyond, or somewhat further frontward along the length of the peripheral wall; so long as the rear wall, with any such extension, is easily removable bodily while leaving remaining at least the front part of the peripheral wall; all contrary to the Chamberlain patent. Preferably, however, the rear and peripheral walls meet contiguously at or near the stator corner, this arrangement having the advantage that the coil lead wires 12 may be led out from the compartment, between the contiguous edges of the rear and peripheral walls, by way of the cutaway notches or open apertures 27 formed in one of them, as at the rear edge of the peripheral wall, for example with a separate aperture 27 for each lead wire 12, as shown in Fig. 3; and this arrangement further permits the use of the frontwardly struck rear wall spurs 23, biting slightly into the lead wires or their sheaths to hold them firmly in place with minimum play. The engagement of the spurs or teeth in the cutaway apertures 27 further serves to facilitate correct mounting of the rear wall upon the other stator portions.

Coming next to the stator interior flange wall 29 this, rather than being integral with the core, is of annular form, extending from the front end of the core outwardly, like a flange, with its outer end formed to furnish an inner series of stator poles, the inner edge of the wall being fitted into a seat or step 30 formed in the core in a manner to give a tight and solid fit. The core and flange wall are preferably preassembled and permanently united mechanically, as by means of spurs or stakes 31 in the nature of lugs gouged out of the soft iron core and bent over outwardly and hammered down against the inner edge of the flange wall.

The termini of the peripheral wall 25 and the flange wall 29 are each shaped, disposed or arranged at the front of the stator to constitute or furnish the field or stator poles; the peripheral wall terminating with what is termed an outer series of poles 36 and the flange wall with an inner series of poles 40, although the poles have their ends all arranged around a common circle. These stator poles are fixed and have their opatives pole ends disposed in operative relation to each other and to the rotary path of the rotor pole ends to be described. Illustratively, the front end or part 33 of the peripheral wall, is continued as an inbent flange or ring 34, scalloped or recessed at 35 to form the outer field poles 36 projecting radially inward. Similarly the outer part or frontward bend 38 of the flange wall 29 is a ring formed with recesses 39 dividing it into the poles 40 of the inner pole series.

An important and characteristic element of the invention, believed to be novel, is an interior partition or diaphragm 42, preferably in the nature of a rigid cross wall between the inner and outer iron parts of the stator, but composed of brass or other non-magnetic material so that, without appreciably affecting the magnetic flux, the motor interior rear and front spaces are effectively separated, and the stator coil and its compartment thus isolated in a liquid tight manner from the remainder of the motor. This partition wall 42 is inscribed on the drawing as non-ferrous.

For separation purposes the diaphragm or partition 42 extends from the stator core 16 and/or its flange wall 29 outwardly to the peripheral wall 25, or rather the frontward part 33 of the latter. In location the partition is arranged to surround the stator core, at a point frontwards of the coil 10 but rearwards of the flange wall 29, the partition thus bounding the coil compartment 9 at the front thereof. The partition is generally annular in form and is joined tightly in unitary connection with the stator parts 25 and 29 and/or 16. While the uniting of these parts might be by welding, brazing or other known tight connecting means, it is more practical and permanent to employ soldering methods, as will be described. Where the parts 16, 29 and 42 meet there is ample contact area for uniting by solder, but at the outer part of the partition 42 it is preferably formed or bent to have a substantial flange or foot 43 having a close or wedge fit with the interior surface of the peripheral wall 25. Such press fitting of the partition to the stator parts may suffice as a tight connection.

When thus constructed the partition or diaphragm 42 serves to isolate or hermetically separate from each other the rear or coil compartment 9 and what may be termed the rotor compartment 44, with which latter may be included the communicating gear case interior space or compartment 45, as well as the bore 17 within the core 16, and other extensions of 44 and 45. The rear compartment and coil are thus protected against entry of the oil within which are immersed the running parts of the motor. The employment of the soldering method of uniting the stator and other parts not merely gives rigid connections and joints but renders them leakproof.

Explaining next the preferred soldering system, and assuming that the core 16 and its flange wall 29 have been united as a subassembly, this member is positioned within the peripheral wall 25, the parts being set up on a fixture with the stator rear side upward. The diaphragm partition may be now or previously inserted in its position shown. A substantial annular gap 46 is provided between the diaphragm and the core, and this allows for the operation of exact centering or concentric relating of the inner and outer parts. When so centered, with the diaphragm set down into contact with the walls 25 and 29, it is only necessary to apply a supply or ring 47 of solder, shown in the form of a wire or strip, wound in place within the recess 46, so that when the parts are sufficiently heated and the solder is melted it will spread outwardly in a capillary manner to form a connecting film 48 between the flange wall and diaphragm, rigidly joining these parts. Another ring 49 of solder is placed at the joint between the diaphragm foot 43 and the peripheral wall so that, when these parts are heated the solder ring 49 melts and spreads downwardly as a uniting film 50 into the joint space or crevice between 25 and 43, preferably simultaneously with the similar uniting at the joint between 29 and 42. By a variation of method the peripheral wall may be united by soldering or brazing with the diaphragm, forming a sub-assembly 25, 42, which later can be assembled with the sub-assembly 16, 29, and the whole united.

Various other solderings to unite permanently and tightly certain fixed or frame parts of the motor may be performed, either in the same heating operation with that designed to connect the stator portions 16, 25 and 29 with diaphragm 42, or in subsequent operations. For example, the main or cup-like wall 52 of the gear case, enclosing the reducing gear train, may have its base flange or flat web portion 53 lying in contact against the inbent flange or ring 34 of the stator peripheral wall 25, the gear case web 53 being open therewithin for mechanical and lubrication communication between the rotor and gear case compartments 44 and 45. To unite such gear case rear or flat wall with said inward flange 34 of the peripheral wall to form a unitary rigid enclosing frame for the motor, it is only necessary to apply a solder supply or ring 54 to the joint between 34 and 52, and, after exactly registering and centering the gear case wall in contact with the stator flange, causing the solder to be melted, so that the solder 54 spreads in a capillary manner to form a film 55 solidly and tightly unifying the fixed gear case wall with the rigid stator elements.

Referring further to the rotor 60 as a whole, on hub 61, this may take different forms but is shown similar to the rotor in said Chamberlain patent. It is preferably a light and disk-like element, scalloped to afford radial poles 70 the ends of which are adapted to travel closely adjacent to the stator pole ends. The rotor shaft 62 turns in rear and front bearings 63 and 64, and on its hub 67 it carries a driving pinion 68; the shaft thrust being conveniently taken by a hardened steel sphere 65. The drive pinion 68 operates through conventional reduction gearing 85, 86, 87, 88 and 91 to rotate the final or output shaft 92, turning in bearing 93.

Functionally, the magnetized rotor structure may be conventional, or as in the Chamberlain patent, and needs little description. It has six main poles 70 radiating from its body 69 in proper relation to the stator poles, deep recesses 71 separating them; and these poles 70 having alternately N and S polarity, hence three of each. As in Chamberlain's motor, each main pole has a peripheral notch or shallow recess 72; thus affording twin subpoles 73 of like polarity. The shown angular spacings are designed to cooperate with the two stator pole series 38 and 40, these latter being alternated, with fifteen in each series, under constant and reversing alternation of polarities. The resulting synchronous cooperation between stator and rotor needs no description, being understood by those conversant with this type of small motor.

In further reference to the gear box, of usual oval or pear shape, with peripheral and base walls 52 and 53, this box is closed by a front wall 57 attached to 52 by solder 58. The motor is mountable in various ways, as by projecting ears 76 with screw holes 77. Interiorly of the case are bearing walls, rear 79 and front 80, forming a gear frame, positioned by gaskets 81 and 82 and completed by spacing posts 83; the walls providing bearings for the gears. Oil may be supplied to the case by way of a tube 95 entering through the wall 57.

Reviewing the main features of the invention already described, these are embodied, as an example, in the structure shown in Figs. 1, 2 and 3. The interior non-magnetic wall 42 is a permanent member affording the first function of acting as a brace or bridge between the peripheral wall 25 and the assembly consisting of the core 16 plus the flange wall 29, relatively positioning or retaining these in their centered or concentric positions, so that the rotor will be accurately concentric with both of the stator pole series. While Fig. 2 shows the bridge wall or partition as preferably attached to both the flange wall and the core, by the introduced solder, it need be attached only to either one of these, to provide both the said function and the second function of isolating the coil compartment, the bridging partition being a closed wall. Thus in Fig. 4 the bridge wall 42A extends directly from the peripheral wall to the core only, and having attaching flanges at both places. In Fig. 5 the bridge or partition wall 42B extends only the short distance between the peripheral wall and the flange wall. In all these cases the inner and outer stator portions are mutually interconnected, non-magnetically, and retained in their correct operative relation. With these features cooperates the feature that the rear part of the stator is suitably openable for access to the isolated coil recess, this being shown as accomplished by the ready detachability of the rear wall, without or with part of the peripheral wall.

The preferred mode of manufacture has been indicated. The stator flange wall may be pre-attached to the core as a sub-assembly, preferably oil-tightly or they may be an integral combination. The partition wall or bridge annulus may be driven into the peripheral wall as a second sub-assembly. These two assemblies may be associated in a jig or fixture and there registered and centered, and then soldered, as described, for mechanically rigid and leaktight unification. The gear box may similarly be pre-assembled, with its contents, and then located and soldered by its rear wall to the inturned terminus of the stator peripheral wall; and finally the gear box front wall may be inserted and soldered, after the gearing and its inside frame walls have been correctly placed with relation to each other and to the driving shaft and pinion. A feature of the invention is the complete method or series of steps of manufacture and the adaptability of the motor structure therefore, as well as the use of the special jigs, fixtures, soldering means and other adjuncts used therein.

There has thus been described a small electric motor, shown as a synchronous motor, embodying the principles and attaining the advantages of the present invention; but since many matters of combination, operation, construction, arrangement and detail may be variously modified without departing from such principles it is not intended to limit the invention to such matters except to the extent set forth in the appended claims.

What is claimed is:

1. A small electric motor having at the rear a poled stator comprising fixed iron portions providing the magnetic circuit, and at the front a cooperating poled rotor; said stator including as rigidly interconnected stator portions a central core member, a rear wall and a peripheral wall extending outwardly and frontwardly from the rear part of said core member, also a flange-wall member extending from the front part of said core member outwardly, said stator portions thereby defining an annular compartment for the stator coil, and the front termini of said peripheral wall and said flange-wall member respectively being shaped and adjacently disposed to constitute outer and inner series of stator poles; and said motor being further characterized in having a closed interior bridge wall or disk of non-magnetic material located frontward of such stator coil compartment but rearward of said flange-wall, and permanently joined tightly at its outer part to said peripheral wall, and at its inner part to the combination consisting of said core member and said flange-wall member; said bridge wall thereby maintaining substantially concentric relations with said stator core and walls, and also constituting a partition oil-tightly separating such coil compartment from the front spaces of the motor.

2. A small synchronous motor as in claim 1 and wherein the partition or bridge wall at its inner parts extends adjacent to both the core member and the flange wall member and is secured liquid-tightly to both thereof; and at its peripheral part is formed with a longitudinal flange or foot adjacent to the inner face of the peripheral wall and secured liquid-tightly thereto.

3. A small synchronous motor as in claim 1 and wherein the partition or bridge wall at its peripheral part is formed with a longitudinal flange or foot adjacent to the inner face of the peripheral wall and secured liquid-tightly thereto.

4. A small motor as in claim 1 and wherein the rear wall is of generally circular form and is removably attached in central contact with the core member by a separate or bolt mounting means near the axial center of the rear wall.

5. A small electric motor of the kind having a poled stator or field element comprising fixed iron portions or members providing the magnetic circuit, associated with an annular energizing coil, and frontwards of such coil a poled rotor element carried on a central shaft; said stator including a central core member within and surrounded by said annular coil, and a rear wall portion extending from the rear end part of the core member outwardly, and a coil-surrounding peripheral wall portion extending from the outer part of the rear wall frontwardly, and an interior annular flange wall member extending from the front end part of the core member outwardly, thereby defining an annular recess for the stator coil, and the termini of the peripheral wall and the flange wall member being shaped and arranged at the front of the stator to constitute respectively outer and inner series of fixed stator poles whose pole ends are disposed in spaced operative relation to each other and to the rotary path of the rotor pole ends; said motor being characterized in the provision of an annular interior partition, diaphragm or rigid cross wall of non-magnetic material, located frontward of the stator coil and rearward of the flange wall member and surrounding the front part of the core member, said partition being a liquid-tight closed wall and being joined tightly at its inner part to one of said members, and at its periphery to the inner side of the peripheral wall; said partition thereby effectively separating and isolating such coil recess from the interior front or rotor space of the motor; and characterized further in that the stator rear wall is formed as a removably separate piece from the core member and from at least the front part of the peripheral wall and has means mounting it magnetically contiguous to said core member and peripheral wall for ready removal and replacement, thereby giving ready access to the annular coil recess for the insertion and removal of the stator coil.

6. A small electric motor having a poled stator comprising fixed iron portions or members providing the magnetic circuit, and frontwards thereof a magnetized poled rotor; said stator portions including a central core member surrounded by an annular coil, and a rear wall extending from the core member outwardly, and a peripheral wall extending from the rear wall frontwardly, and a flange wall member extending from the front part of the core member outwardly, thereby defining an annular recess for the stator coil, and the termini of the peripheral wall and the flange wall member being shaped and arranged to constitute respectively outer and inner series of fixed stator poles whose pole ends are disposed in spaced operative relation to each other and to the rotary path of the rotor pole ends; said motor being characterized in containing an annular partition of non-magnetic material located frontward of the stator coil recess but rearward of the flange wall member, said partition being a liquid-tight closed wall, and being permanently joined tightly around its inner part to one of said members, and around its periphery to the inner side of the peripheral wall, thereby isolating such coil recess from the front or rotor spaces of the motor; and characterized further in that the stator rear wall is formed as a separate piece from the core member and from the peripheral wall or the front part thereof, and has means mounting it for ready removal and replacement, thereby giving ready access to the annular coil recess.

7. A small synchronous motor as in claim 6 and wherein the partition wall at its inner part extends adjacent to both the core member and the flange wall member and is secured liquid-tightly to both thereof, as by solder joints.

8. A small synchronous motor as in claim 6 and wherein the partition wall at its inner part extends adjacent to both the core member and the flange wall member and is secured liquid-tightly to both thereof, as by solder joints; and at its peripheral part is formed with a longitudinal flange or foot adjacent to the inner face of the peripheral wall and secured tightly thereto, as by soldering.

9. A small motor as in claim 6 and wherein the rear wall is a circular separate piece from the entire peripheral wall and is attached in central contact with the core member and in rim contact with peripheral wall by a separate or bolt mounting means, near the axial center of the rear wall.

10. A small motor as in claim 6 and wherein the partition is secured by solder joints to the core member and to the flange wall member, which joints also are oil-tight.

11. A small motor as in claim 6 and wherein the partition inner part terminates short of the core member, leaving a precentering gap, and wherein said gap and adjacent joints are soldered to render oil-tight said joints and to secure together the core member and flange wall member with the partition and peripheral wall in their precentered position.

12. A small motor as in claim 6 and wherein the rear wall is a separate disk, the peripheral edge of which meets the rear edge of the peripheral wall at the rear outer corner of the stator; the peripheral wall rear edge having at least one edge notch accommodating the leads of the stator coil, and the rear disk wall having for each such notch a spur struck frontwardly from its edge to enter the edge notch, thereby to position and register the rear wall and apply holding pressure upon the coil leads in such notch.

13. A small electric motor having a poled stator comprising fixed iron portions or members providing the magnetic circuit, and frontwards thereof a magnetized poled rotor; said stator portions including a central core member surrounded by an annular coil, and a rear wall extending from the core member outwardly, and a peripheral wall extending from the rear wall frontwardly, and a flange wall member extending from the front part of the core member outwardly, thereby defining an annular compartment for the stator coil, and the termini of the peripheral wall and the flange wall member being shaped and arranged to constitute respectively outer and inner series of fixed stator poles; and said motor being characterized in containing a closed annular partition of non-magnetic material located frontward of the stator coil compartment but at least partly rearward of the flange wall member, said partition being an oil-tight closed wall, permanently joined tightly around its inner part to one of said members and around its periphery to the peripheral wall, thereby isolating such coil compartment from the front or rotor space of the motor; and characterized further in that the stator coil compartment to the rear of said partition is openable for ready access thereto and for the assembling of a coil therein or removing or replacing the coil at will.

14. A small electric motor having a poled stator comprising fixed iron portions or members providing the magnetic circuit, and frontwards thereof a magnetized poled rotor; said stator portions including a central core member surrounded by an annular coil, and a rear wall extending from the core member outwardly, and a peripheral wall extending from the rear wall frontwardly, and a flange wall member extending from the front part of the core member outwardly, thereby defining an annular compartment for the stator coil, and the termini of the peripheral wall and the flange wall member being shaped and arranged to constitute respectively outer and inner series of fixed stator poles; said motor being characterized in containing a permanent interior centering, holding and sealing closed partition wall of non-magnetic material located frontward of the stator coil compartment but at least partially rearward of the flange wall member, and rigidly interconnecting said peripheral wall with said flange wall member and core member thereby to maintain their relative positions; and characterized further in that the stator rear wall is formed as a round disk separate both from the core member and from at least the front part of the peripheral wall and has means mounting it magnetically contiguous to said core member and said peripheral wall for ready removal and replacement, thereby giving ready access to the annular coil recess.

15. A small electric motor having a poled stator comprising fixed iron portions providing the magnetic circuit, and frontwards thereof a poled rotor; said stator including as rigidly interconnected stator portions a central core member surrounded by an annular coil, a rear wall, a peripheral wall extending from the rear wall frontwardly, and a flange wall member extending from the front part of the core member outwardly; thereby defining an annular compartment for the coil, and the termini of the peripheral wall and the flange wall member being shaped to constitute outer and inner series of stator poles; and said motor having an oil-tight closed interior bridge wall of non-magnetic material located frontward of the stator coil compartment, and permanently joined tightly at its outer part to the peripheral wall, and at its inner part to the assembly consisting of the core member and the flange wall member, thereby spacing apart and centering the peripheral wall and such assembly, and also acting as a partition oil-tightly separating such coil compartment from the front spaces of the motor.

EUGENE L. SCHELLENS.

REFERENCES CITED

The following references are of record in the file of this patent:

UNITED STATES PATENTS

| Number | Name | Date |
|---|---|---|
| 2,322,924 | Daiger | June 29, 1943 |
| 2,383,828 | Swift | Apr. 28, 1945 |
| 2,423,750 | Benson | July 8, 1947 |
| 2,424,020 | Chataelain | July 15, 1947 |

FOREIGN PATENTS

| Number | Country | Date |
|---|---|---|
| 477,835 | Great Britain | Jan. 3, 1938 |
| 489,246 | Great Britain | July 22, 1938 |